(12) United States Patent
Zhang et al.

(10) Patent No.: US 11,453,758 B2
(45) Date of Patent: Sep. 27, 2022

(54) METHOD OF CONTINUOUS PREPARATION OF RECLAIMED RUBBER USING MULTI-STAGE SCREW EXTRUDERS

(71) Applicants: NANJING GREEN GOLD GIANT RUBBER & PLASTIC HI-TECH CO., LTD., Nanjing (CN); BEIJING UNIVERSITY OF CHEMICAL TECHNOLOGY, Beijing (CN)

(72) Inventors: Liqun Zhang, Beijing (CN); Dongyun Ren, Nanjing (CN); Jinwei Shi, Nanjing (CN); Fengxing Ge, Nanjing (CN); Chengjie Chen, Nanjing (CN); Fengxin Wang, Nanjing (CN)

(73) Assignee: NANJING GREEN GOLD GIANT RUBBER & PLASTIC HI-TECH CO., LTD., Beijing (CN)

( * ) Notice: Subject to any disclaimer, the term of this patent is extended or adjusted under 35 U.S.C. 154(b) by 750 days.

(21) Appl. No.: 16/476,535

(22) PCT Filed: Dec. 27, 2017

(86) PCT No.: PCT/CN2017/118796
§ 371 (c)(1),
(2) Date: Jul. 8, 2019

(87) PCT Pub. No.: WO2019/090938
PCT Pub. Date: May 16, 2019

(65) Prior Publication Data
US 2019/0382552 A1    Dec. 19, 2019

(30) Foreign Application Priority Data

Nov. 10, 2017  (CN) .......................... 201711102594.7

(51) Int. Cl.
*C08J 11/28*     (2006.01)
*B29B 7/48*     (2006.01)
(Continued)

(52) U.S. Cl.
CPC .................. *C08J 11/28* (2013.01); *B29B 7/48* (2013.01); *B29B 7/7466* (2013.01); *B29B 7/823* (2013.01);
(Continued)

(58) Field of Classification Search
None
See application file for complete search history.

(56) References Cited

U.S. PATENT DOCUMENTS 7,767,722 B2 * 8/2010 Fan .......................... C08J 11/20
                                                    521/44.5
2012/0004331 A1 * 1/2012 Zhao ....................... C08J 11/12
                                                    422/198
(Continued)

FOREIGN PATENT DOCUMENTS

CN    101508795 A    8/2009
CN    102816343 A    12/2012
(Continued)

OTHER PUBLICATIONS

English abstractor CN 102977404 A, 9 pages, Mar. 20, 2013, China.*

(Continued)

*Primary Examiner* — Tae H Yoon
(74) *Attorney, Agent, or Firm* — J.C. Patents

(57) ABSTRACT

The invention relates to a method of preparing reclaimed rubber, especially using multi-stage screw extruders, which belongs to the field of recycling and reusing of waste rubber. The rubber powder and softener which were preliminarily mixed are compacted and added into first counter rotating (Continued)

twin screw extruder through thermal insulation and metering apparatus, the softener permeates the waste rubber powder uniformly under the action of temperature in the extruder to finish primary desulfurization of rubber waste powder; add preliminary devulcanized material continuously into second multi screw extruder after cooling by transformation device, rapid desulfurization and regeneration can be achieved by means of activator and shear action; The desulfurized rubber powder is cooled and transported into the third multi-screw extruder in series, the performance of deprocessing can be improved by shear action under low temperature; After extrusion, the recycled rubber is obtained by molding device and cooling device. The whole process is completed under closed oxygen isolation condition, realizing safe, simple and continuous desulfurization regeneration. It is energy saving and environmental protection with excellent properties.

5 Claims, 4 Drawing Sheets

(51) Int. Cl.
*B29B 7/74* (2006.01)
*B29B 7/90* (2006.01)
*B29B 7/82* (2006.01)
*C08L 17/00* (2006.01)
*B29K 105/26* (2006.01)

(52) U.S. Cl.
CPC ............... *B29B 7/90* (2013.01); *C08L 17/00* (2013.01); *B29K 2105/26* (2013.01); *C08J 2319/00* (2013.01); *C08L 2205/03* (2013.01)

(56) References Cited

U.S. PATENT DOCUMENTS

2012/0184634 A1* 7/2012 Chen .................. C10G 1/10
521/42.5
2016/0272778 A1* 9/2016 Yuan ................ B29B 17/04

FOREIGN PATENT DOCUMENTS

| CN | 102888030 A | 1/2013 |
| CN | 102911399 A | 2/2013 |
| CN | 102977404 A | 3/2013 |
| CN | 103087349 A | 5/2013 |
| CN | 102977404 B | 11/2014 |
| CN | 103665428 B | 10/2015 |
| CN | 1040042226 | 3/2017 |

OTHER PUBLICATIONS

The International Search Report of corresponding international application No. PCT/CN2017/118796, dated Jul. 20, 2018.

* cited by examiner

METHOD OF CONTINUOUS PREPARATION OF RECLAIMED RUBBER USING MULTI-STAGE SCREW EXTRUDERS

CROSS-REFERENCE TO RELATED APPLICATION

This application is a national phase application of international application No. PCT/CN2017/118796 filed on Dec. 27, 2017, which in turn claims the priority benefits of Chinese application No. 201711102594.7, filed on Nov. 10, 2017. The contents of these prior applications are hereby incorporated by reference in their entirety.

TECHNICAL FIELD

The invention relates to a method of preparing reclaimed rubber, especially using multi-stage screw extruders, which belongs to the field of recycling and reusing of waste rubber.

BACKGROUND ART

In order to reach the requirements of the rubber products, such as rubber tire, rubber belt, rubber tube, etc., the raw rubber must be vulcanized. Linear macromolecule of raw rubber turns into three-dimensional network after vulcanization and vulcanized rubber shows high strength, high elasticity, high wear resistance and corrosion resistance. Sulfur vulcanization is one of the most common methods of rubber vulcanization, which forms S—S and C—S bond to connect linear macromolecule chains and generates cross-linked network. The waste rubber with three-dimensional network structure is insoluble and inmeltable, which makes it difficult to deal with. Waste rubber has become one of the most harmful industrial hazardous wastes. In 2015, the waste tires output is more than 40 million tons in the world. Preparing reclaimed rubber is not only good for resolving pollution problem, but also conducive to save raw materials. In China, it is the major way to reuse waste rubber and the annual output of reclaimed rubber is more than 4 million tons, accounting for 80% of the global reclaimed rubber production.

Usually, there are two main viewpoints on the mechanism of the bond breakage of waste rubber: 1. different bond energy among the three different chemical bonds; 2. different elastic constant among the three different chemical bonds. The bond energy difference is that the energy of C—C bond is higher than the C—S bond and S—S bond. The C—S bond and S—S bond will be broken by heating, while the backbone is not broken. The elastic coefficient between chemical bonds is different; thus, the C—C bonds, C—S bonds and S—S bonds can be selectively broken by shear stress.

In China, the traditional industrial reclaiming method is based on the bond energy mechanism. The preparation of reclaimed rubber process is divided into the desulfurization process which using high temperature and high pressure dynamic desulfurization tank as desulfurization equipment and refining process using high-speed double roller mill as refining equipment. During the desulfurization process, oil, desulfurization agent, and water are added into desulfurization tank, and the working pressure is about 2.2 MPa, the operating temperature is about 220° C. Reclaimed rubber powder is prepared after about 3 hours. With the assist of oil, devulcanizing agent permeates into the waste rubber, breaks crosslinking network and makes it quasi-linearized. But under the condition of high temperature, the regenerant permeates from the outside in, and waste rubber powder can't be devulcanized uniformly to generate a "core-shell" structure causing a deterioration of the mechanical properties. In order to avoid the decrease of the mechanical properties due to excessive and inhomogenous devulcanization of rubber powder, the desulfurization degree is usually low, and the processing property of the reclaimed rubber powder is usually bad. In order to obtain a devulcanized rubber with both good processing property and mechanical properties, the reclaimed rubber powder must be refined by 3~4 sets of high-speed double roller mills at low temperature; and then the reclaimed rubber But, the high-speed refiners is of high potential safety risk. Intermittent operation is inefficiency and it is difficult to control the craft due to serious scaling in the tank. The open operation environment of refiners causes large gas and serious environmental pollution. The safety factor is lower and low devulcanization degree leads to high energy consumption.

At present, people have been actively improving the traditional way of devulcanization, devulcanization tanks are gradually eliminated by the market. Chinese patent CN103665428B (Continuous high temperature and pressure desulfurization unit) discloses a method that they make waste rubber mixed with regenerant through spiral in the devulcanization machine to achieve continuous, closed devulcanization of waste rubber. By increasing the devulcanization temperature to 300° C., reaction time is shortened to 15~20 minutes. However, due to spiral structure cannot make the material dense, poor heat transfer and slow permeability leads to poor mechanical properties of reclaimed rubber. Chinese patent CN103087349A (Single-screw thermo-chemical and powerful shearing compound desulfurization apparatus and desulfurization method) discloses a method that by adding pins to single screw extruder barrel and adjusting screw elements, single screw can not only maintain thermochemical reaction function, but also enhance devulcanization effect of the thermochemical reaction by high shear stress. However, material in the single screw extruder is not always in the condition of compaction, inevitably mixed with oxygen, resulting in severe degradation of rubber chain at high temperature. Chinese patent CN102977404B (Method for continuous preparation of reclaimed rubber by using dual-band twin-screw extruder) discloses a method that hey pretreat waste rubber powder and regenerant in a mixer, and then place the mixed material at high temperature so that the regenerant can permeate into and swell the powder sufficiently. Add the prepared material into the counter-rotating twin-screw extruder, replacing the traditional high temperature and high pressure dynamic devulcanization tank. Replace refiners with co-rotating twin-screw extruder to provide high shear stress to improve the processability of the obtained devulcanized rubber. The viscosity of the regenerant is still high at 50° C.~100° C. and 12 hours~36 hours are needed to complete the permeation. Therefore, this intermittent operation has low production efficiency and large energy consumption due to long holding time under high temperature. Heat is still transferred from outside of the rubber powder to inside in counter-rotating twin-screw extruder, inevitably, the existence of "core-shell" structure leads to poor mechanical properties.

Due to the influence of heat transfer process and permeation effect, it is difficult to realize uniform devulcanization using different bond energy between chemical bonds as it is apt to form "core shell" structure. Hence, a great deal of work has been done by domestic and foreign scholars on using different elasticity coefficient between chemical bonds to break crosslinks selectively, and many achievements have been made. Chinese patent CN102888030B (Waste rubber high-temperature normal-pressure regenerating process) discloses a method that without adding any softener and catalyst, press mixed rubber powder into a twin-screw extruder by a forced feeder. Rapid devulcanization reaction is realized at high temperature and high shear stress. Shear the cooled material on frequency conversion open mill at high speed, and then refine and mold on open mill and rubber film is obtained after filtration. In result of without adding any additives, waste rubber powder has high viscosity and is very hard, and the temperature of the softening zone of twin-screw extruder need to be heated up to 300° C.~350° C. to make the rubber powder quickly soften, which inevitably leads to degradation of main chain and results in decline of mechanical properties of reclaimed rubber. Chinese patent CN104004222B (One kind of waste rubber and a low-temperature process for the continuous reproducing apparatus) discloses a method that mix waste rubber powder with the reclaiming agent and finish preliminary devulcanization in internal mixer, and then add the material into twin-screw extruder to undergo mechanochemical reaction. After that it is transported by belt conveyor to open mill to be refined. Reclaimed rubber is obtained after cooling. Open type conveyor and refining apparatus pollute the environment, and that batched material in the internal mixer is discharged directly from the outlet of the internal mixer to the entrance of the twin-screw extruder leads to unstable production process. Utilizing different elastic coefficient between chemical bonds to control proper shear stress can selectively break bond to devulcanization, which avoids the problem of "core-shell" structure due to uneven permeability.

SUMMARY

The invention provides a method of overcoming deficiency of the existing devulcanization technique by solely using different bond energy or different elastic coefficient between chemical bonds, proposes a method of continuous preparation of reclaimed rubber, especially continuous preparation of reclaimed rubber by using multi-stage screw extruders.

The procedure of the invention is: method of continuous preparation of reclaimed rubber using multi-stage screw extruders, comprising: first, mix waste rubber powder and softener in mixer for 5 to 25 minutes at 60° C. to 120° C., then transport it into 60° C.~120° C. thermal insulation buffer tank to feed into the first counter rotating twin screw extruder through thermal insulation and metering apparatus, stays for 1 to 6 minutes at 100° C. to 340° C. in extruder to complete uniform penetration of softener into the waste rubber powder and preliminary devulcanization, cool the preliminary devulcanized material to 40 to 80° C. under airtight conditions in continuous cooling apparatus to obtain the preliminary devulcanized material with Mooney viscosity of 100 to 230, add preliminary devulcanized material continuously into second multi screw extruder through thermal insulation and metering apparatus, devulcanizing agent is added through side feeding apparatus and control the temperature of the barrel and mandrel of the multi screw extruder at 20 to 110° C., proceed devulcanization reaction for 1 to 6 minutes and extrude devulcanized rubber powder with Mooney viscosity of 70~150, cool the devulcanized rubber powder to 25° C. to 60° C. under airtight conditions in continuous cooling apparatus, continuously add the devulcanized rubber powder into the third multi screw extruder, control the temperature of barrel and mandrel of the multi screw extruder at −5 to 50° C. and refine the devulcanized rubber powder for 1 to 10 minutes under shear condition, refining process is finished as the reclaimed rubber is extruded from the third extruder and passes molding apparatus and cooling apparatus to cool to 50° C., the required reclaimed rubber is obtained after package;

The mass ratio between waste rubber powder, softener and devulcanizing agent is 100:(2~20):(0.01~3);

Softener is one or several mixtures of coal tar, aromatic hydrocarbon oil, pine tar, tall oil, dipentene, paraffin oil, oleic acid, cottonseed oil, rosin, said devulcanizing agent is one of an aromatic hydrocarbon disulfide, a multi alkyl phenol sulfide, a phenylmercaptan, an amine compound, or combinations thereof;

Waster rubber powder is one kind of waste radial truck tire powder, waste passenger car tire powder, or combinations thereof.

Method of continuous preparation of reclaimed rubber using multi-stage screw extruders in claim 1, comprising: multi screw extruder is one kind of co-rotating twin screw extruder and parallel triple screw extruder.

Method of continuous preparation of reclaimed rubber using multi-stage screw extruders in claim 1, comprising: in counter rotating twin screw extruder, the temperature of heating and exhaust zone, holding zone and cooling zone is at 120° C. to 200° C., 200° C. to 340° C. and 100° C. to 200° C. respectively.

Method of continuous preparation of reclaimed rubber using multi-stage screw extruders in claim 1, comprising: in second multi screw extruder, the temperature of mixing zone, shear zone and cooling zone is at 40° C. to 70° C., 70° C. to 90° C., and 30° C. to 60° C. respectively.

Method of continuous preparation of reclaimed rubber using multi-stage screw extruders in claim 1, comprising: in third multi screw extruder, the temperature of first conveying zone, pre-shear zone, second conveying zone, second shear zone and third conveying zone is at 0° C. to 25° C., 5° C. to 40° C., 5° C. to 25° C., −5° C. to 35° C., and 0° C. to 45° C. respectively.

The invention involves rational design of softener penetration and regeneration processes of waste rubber powder, including preliminary devulcanization, devulcanization process and refining process. Series of screw extruders are used as devulcanization and regeneration apparatus of waste rubber powder, which ensures safety and continuous production of waste rubber recycling process. The well-mixed of waste rubber powder and softener can realize uniform penetration of softener in counter-rotating twin screw extruder. In the absence of activator, only some little molecular chains are broken in fact and the rubber powder are basically in the condition of preliminary devulcanization and swelling uniformly. Add the preliminary devulcanized material into second multi-screw extruder, softener and activator is blended uniformly because of their good compatibility in mixing zone of extruder. Devulcanization reaction occurs in the presence of activator and shear stress in shear zone wherein activator has the optimum activity at the temperature. Uniformly devulcanized rubber powder is obtained after cooled down and the whole process prohibits the entry of oxygen. In consequence of obvious changes of chemical structure of the rubber powder after devulcanization, carry out refining process at the third multi-screw extruder at low temperature which can reduce Mooney viscosity and improve the processability of reclaim rubber, but effectively avoiding break of main chain.

That adding softener and activator at the different positions in sequence can effectively decrease devulcanization reaction during the softener penetration process. The process can cause uneven devulcanization as softener and activator simultaneously added. In fully swelling waste rubber powder by softener, molecular chains are at extensional state so that it significantly reduces the required devulcanization temperature. The synergistic effect between activator and shear stress greatly improves devulcanization efficiency of breaking S—S bond and protects mechanical properties of reclaimed rubber. Mooney viscosity of devulcanized rubber powder without "core-shell" structure or hard particles can be rapidly reduced, and it reduces the energy consumption of refining process.

Counter rotating screw extruder has excellent positive displacement conveying ability, and it can rationally adjust penetration time. Its self-cleaning ability can avoid scale formation and carbonization that can cause process changes, so that product quality is stable and the apparatus is convenient to maintain. Based on computer simulation, material flow direction and velocity process multiple changes through design and combination of threaded elements. So that two kinds of multi screw extruders are designed to meet the requirements of devulcanization and refining process. This invention overcomes drawbacks of traditional devulcanization regeneration method by optimizing formula, process design and apparatus, and greatly reduces energy consumption and realizes airtight, oxygen free and automatic production. The prepared reclaim rubber shows good performance. The whole process has the advantages of safety operation, simplicity, continuity, energy saving and environmental protection.

BRIEF DESCRIPTION OF THE DRAWING

1. Thermal insulation and metering apparatus, 2. First motor, 3. First reducer, 4. Counter rotating twin screw, 5. Counter rotating twin screw extruder barrel, 6. Cooling conveying apparatus, 7. Second motor, 8. Second reducer, 9. Multiple-screw 1, 10. Multiple-screw barrel 1, 11. Third motor, 12. Third reducer, 13. Multiple-screw 2, 14. Multiple-screw barrel 2, 15. Cooling conveying apparatus, 16. Package apparatus

Figure 1:
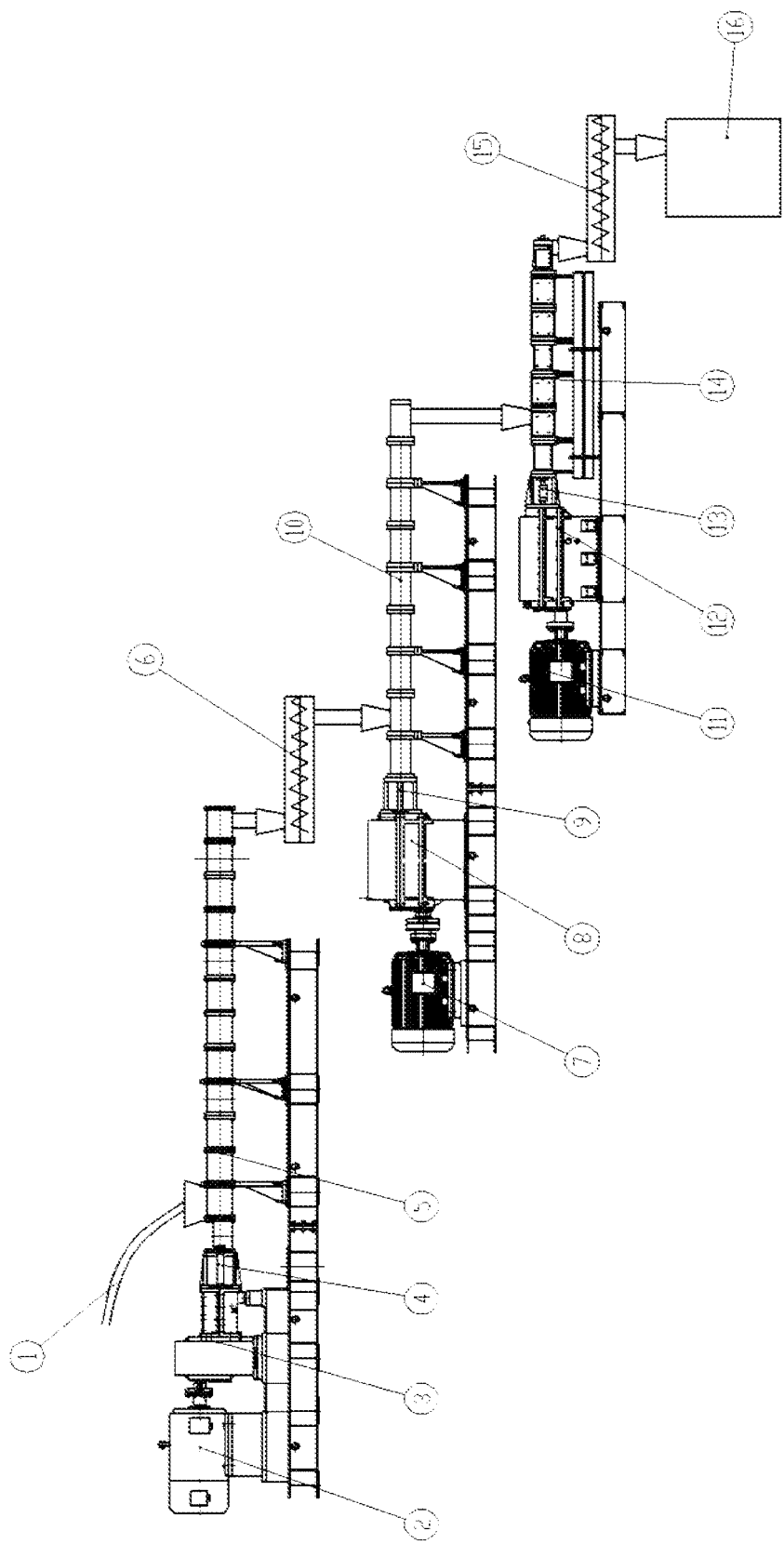
FIG. 1 is a process flow diagram illustrating how multi-stage extruders connect and work to produce reclaimed rubber in the present invention.
Figure 2:
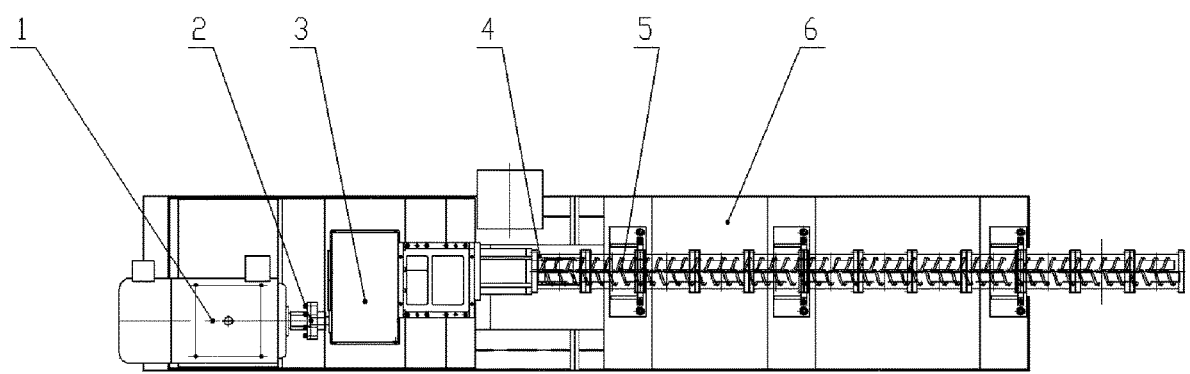
FIG. 2 is a counter rotating twin screw extruder diagram wherein softener permeates into the waste rubber powder.
Figure 3:
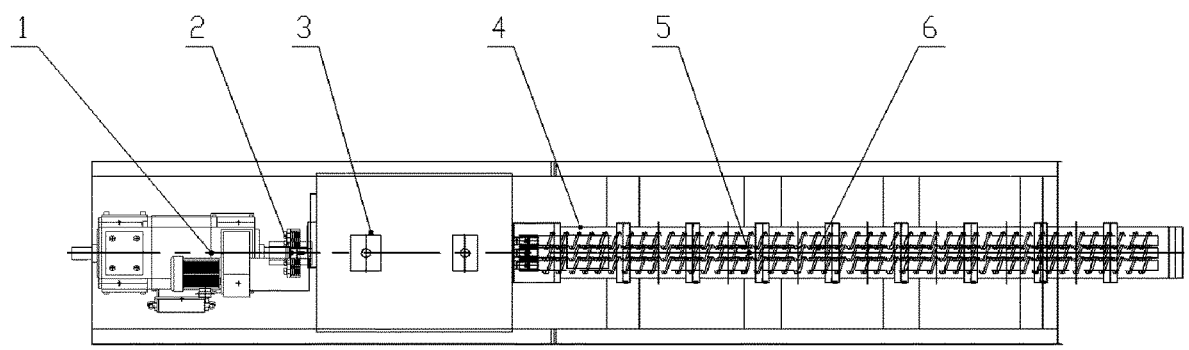
FIG. 3 is a co-rotating tri-screw extruder diagram.
Figure 4:
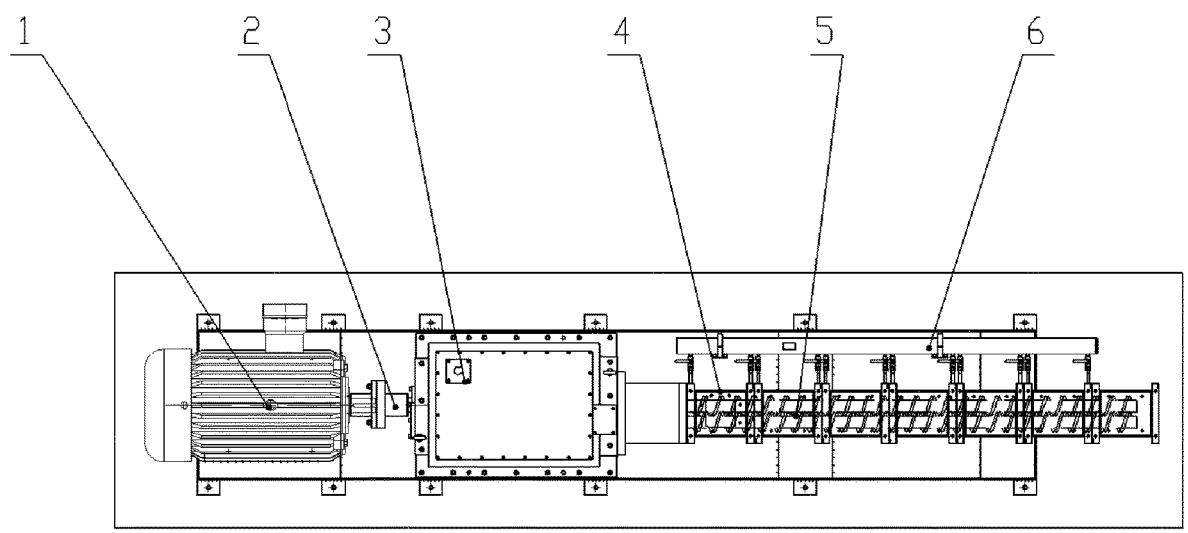
FIG. 4 is a co-rotating twin-screw extruder diagram.

1. Motor, 2. Coupling, 3. Reducer, 4. Counter rotating twin screw, 5. Barrel, 6. Base

DETAILED DESCRIPTION OF THE EMBODIMENT

The principles and features of this invention may be employed in various and numerous embodiments without departing from the scope of the invention. The following is a further description of the invention. Phr means mass percent unless otherwise stated.

Example 1

Add 10 phr coal tar and 10 phr pine tar as softener, 100 phr waste radial truck tire tread rubber powder into mixer and stir for 8 minutes at 60° C., and then the prepared material is continuously conveyed to counter rotating twin screw extruder through enclosed, thermal insulation conveying metering apparatus. The temperature of heating and exhaust zone, holding zone and cooling zone of the counter rotating twin screw extruder is at 180° C., 230° C. and 160° C. respectively. After staying in extruder for 2 minutes, preliminary devulcanized powder with Mooney viscosity 195 is obtained. The preliminary devulcanized powder is cooled down to 50° C. by the following cooling conveyor and subsequently transported into co-rotating twin screw extruder. Add 0.1 phr activator 2,2'-bisthio-bis(4-methyl-6-t-butylphenol) from side feeding. The temperature of mixing zone, shear zone and cooling zone of the co-rotating twin screw extruder are at 45° C., 70° C. and 35° C. respectively. Devulcanization reaction time lasts 3 minutes and devulcanized rubber powder with Mooney viscosity 110 is extruded. The devulcanized rubber powder is continuously feed into parallel tri-screw extruder through cooling conveying apparatus under enclosed condition. Temperature of first conveying zone, pre-shear zone, second conveying zone, second shear zone and third conveying zone of the parallel tri-screw extruder are at 15° C., 30° C., 20° C., 15° C. and 10° C. respectively, and the mandrel temperature is at 10° C. Refine the devulcanized rubber powder for 3 minutes under shear condition, and refining process is finished as the reclaimed rubber is extruded from the parallel tri-screw extruder and passes molding apparatus and cooling apparatus to 40° C. Mooney viscosity of the obtained reclaimed rubber is 53.

|  | Ash content % | Acetone extract % | Mooney viscosity ML100° C. (1 + 4 min) | Tensile strength MPa | Elongation % |
| --- | --- | --- | --- | --- | --- |
| Example 1 | 7.5 | 16.8 | 53 | 16.3 | 535 |
| GB/T15340-2008, TA1 | ≤10 | ≤18 | ≤95 | ≥14 | ≥420 |

Example 2

Add 2 phr tall oil and 3 phr pine tar as softener, 100 phr waste radial truck tire tread rubber powder into mixer and stir for 15 minutes at 80° C., and then the prepared material is continuously conveyed to counter rotating twin screw extruder through enclosed, thermal insulation conveying metering apparatus. The temperature of heating and exhaust zone, holding zone and cooling zone of the counter rotating twin screw extruder is at 160° C., 280° C. and 120° C. respectively. After staying in extruder for 5 minutes, preliminary devulcanized powder with Mooney viscosity 180 is obtained. The preliminary devulcanized powder is cooled down to 60° C. by the following cooling conveyor and subsequently transported into co-rotating twin screw extruder. Add 3.0 phr activator diphenyldisulfide from side feeding. The temperature of mixing zone, shear zone and cooling zone of the co-rotating twin screw extruder are at 55° C., 80° C. and 40° C. respectively. Devulcanization reaction time lasts 3 minutes and devulcanized rubber powder with Mooney viscosity 100 is extruded. The devulcanized rubber powder is continuously feed into parallel tri-screw extruder through cooling conveyor under enclosed condition. Temperature of first conveying zone, pre-shear zone, second conveying zone, second shear zone and third conveying zone of the parallel tri-screw extruder are at 15° C., 30° C., 20° C., 25° C. and 15° C. respectively, and the mandrel temperature is at 10° C. Refine the devulcanized rubber powder for 3 minutes under shear condition, and refining process is finished as the reclaimed rubber is extruded from the parallel tri-screw extruder and passes molding apparatus and cooling apparatus to 40° C. Mooney viscosity of the obtained reclaimed rubber is 53.

|  | Ash content % | Acetone extract % | Mooney viscosity ML100° C. (1 + 4 min) | Tensile strength MPa | Elongation % |
| --- | --- | --- | --- | --- | --- |
| Example 2 | 6.2 | 13.5 | 62 | 15.1 | 480 |
| GB/T15340-2008, TA1 | ≤10 | ≤18 | ≤95 | ≥14 | ≥420 |

Project Case 3:

Add 8 phr tall oil, 6 phr pine tar and 4 phr rosin as softener, 100 phr waste radial truck tire tread rubber powder into mixer and stir for 20 minutes at 100° C., and then the prepared material is continuously conveyed to counter rotating twin screw extruder through enclosed, thermal insulation conveying metering apparatus. The temperature of heating and exhaust zone, holding zone and cooling zone of the counter rotating twin screw extruder is at 160° C., 260° C. and 140° C. respectively. After staying in extruder for 5 minutes, preliminary devulcanized powder with Mooney viscosity 160 is obtained. The preliminary devulcanized powder is cooled down to 55° C. by the following cooling conveyor and subsequently transported into co-rotating twin screw extruder. Add 0.2 phr activator n-butylamine from side feeding. The temperature of mixing zone, shear zone and cooling zone of the co-rotating twin screw extruder are at 65° C., 90° C. and 50° C. respectively. Devulcanization reaction time lasts 3 minutes and devulcanized rubber powder with Mooney viscosity 90 is extruded. The devulcanized rubber powder is continuously feed into parallel tri-screw extruder through cooling conveyor under enclosed condition. Temperature of first conveying zone, pre-shear zone, second conveying zone, second shear zone and third conveying zone of the parallel tri-screw extruder are at 5° C., 15° C., 10° C., 20° C. and 15° C. respectively, and the mandrel temperature is at 15° C. Refine the devulcanized rubber powder for 2 minutes under shear condition, and refining process is finished as the reclaimed rubber is extruded from the parallel tri-screw extruder and passes molding apparatus and cooling apparatus to 30° C. Mooney viscosity of the obtained reclaimed rubber is 50.

|  | Ash content % | Acetone extract % | Mooney viscosity ML100° C. (1 + 4 min) | Tensile strength MPa | Elongation % |
| --- | --- | --- | --- | --- | --- |
| Example 3 | 7.0 | 14.2 | 50 | 15.0 | 485 |
| GB/T15340-2008, TA1 | ≤10 | ≤18 | ≤95 | ≥14 | ≥420 |

What is claimed is:

1. Method of continuous preparation of reclaimed rubber using multi-stage screw extruders, comprising: first, mixing waste rubber powder and softener in a mixer for 5 to 25 minutes at 60° C. to 120° C. to obtain a mixture, then the mixture being transported into a thermal insulation buffer tank kept at 60° C.~120° C., and fed into a first counter rotating twin screw extruder through a thermal insulation and metering apparatus, which stays for 1 to 6 minutes at 100° C. to 340° C. in the extruder to complete uniform penetration of the softener into the waste rubber powder and preliminary devulcanization, cooling to 40 to 80° C. under airtight conditions in a continuous cooling apparatus to obtain a preliminary devulcanized material with Mooney viscosity of 100 to 230, adding the preliminary devulcanized material continuously into a second multi screw extruder through the thermal insulation and metering apparatus, adding a devulcanizing agent through a side feeding apparatus and controlling the temperature of a barrel and mandrel of the multi screw extruder at 20 to 110° C., proceeding devulcanization reaction for 1 to 6 minutes and extruding devulcanized rubber powder with Mooney viscosity of 70~150, cooling the devulcanized rubber powder to 25° C. to 60° C. under airtight condition in a continuous cooling apparatus, continuously adding the devulcanized rubber powder into a third multi screw extruder, controlling the temperature of barrel and mandrel of the multi screw extruder at -5 to 50° C. and refine the devulcanized rubber powder for 1 to 10 minutes under shear condition, wherein refining process is finished as the reclaimed rubber is extruded from the third extruder and passes a molding apparatus and a cooling apparatus to cool to below 50° C., the required reclaimed rubber is obtained after package; wherein the mass ratio between waste rubber powder, softener and devulcanizing agent is 100:(2~20):(0.01~3);

softener is one or several mixtures of coal tar, aromatic hydrocarbon oil, pine tar, tall oil, dipentene, paraffin oil, oleic acid, cottonseed oil, rosin, said devulcanizing agent is one of an aromatic hydrocarbon disulfide, a multi alkyl phenol sulfide, a phenylmercaptan, an amine compound, or combinations thereof;

waster rubber powder is one kind of waste radial truck tire powder, waste passenger car tire powder, or combinations thereof.

2. Method of continuous preparation of reclaimed rubber using multi-stage screw extruders in claim 1, wherein the multi screw extruder is a co-rotating twin screw extruder or a parallel triple screw extruder.

3. Method of continuous preparation of reclaimed rubber using multi-stage screw extruders in claim 1, wherein in the counter rotating twin screw extruder, the temperature of heating and exhaust zone, holding zone and cooling zone is in the range of 120° C. to 200° C., 200° C. to 340° C. and 100° C. to 200° C., respectively.

4. Method of continuous preparation of reclaimed rubber using multi-stage screw extruders in claim 1, wherein in the second multi screw extruder, the temperature of mixing zone, shear zone and cooling zone is in the range of 40° C. to 70° C., 70° C. to 90° C., and 30° C. to 60° C., respectively.

5. Method of continuous preparation of reclaimed rubber using multi-stage screw extruders in claim 1, wherein in the third multi screw extruder, the temperature of first conveying zone, pre-shear zone, second conveying zone, second shear zone and third conveying zone is in the range of 0° C. to 25° C., 5° C. to 40° C., 5° C. to 25° C., -5° C. to 35° C., and 0° C. to 45° C., respectively.

* * * * *